US009099872B2

(12) United States Patent
Fertman et al.

(10) Patent No.: US 9,099,872 B2
(45) Date of Patent: Aug. 4, 2015

(54) ELECTRICAL ENERGY BUFFERING SYSTEM

(75) Inventors: Mark Fertman, Toronto (CA); Efim Serebrianik, Woodbridge (CA)

(73) Assignee: NIM ENERGY INC., Toronto, Ontario ( * ) Notice: Subject to any disclaimer, the term of this patent is extended or adjusted under 35 U.S.C. 154(b) by 405 days.

(21) Appl. No.: 13/417,081

(22) Filed: Mar. 9, 2012

(65) Prior Publication Data

US 2012/0229101 A1    Sep. 13, 2012

(30) Foreign Application Priority Data

Mar. 9, 2011    (EP) .................................... 11157409

(51) Int. Cl.
*H02J 7/00*    (2006.01)
*H02J 7/34*    (2006.01)
*H02J 1/00*    (2006.01)

(52) U.S. Cl.
CPC ............... *H02J 7/0024* (2013.01); *H02J 7/345* (2013.01); *H02J 7/0054* (2013.01); *H02J 2001/004* (2013.01); *Y02T 10/7055* (2013.01)

(58) Field of Classification Search
CPC ....................................................... H02J 7/345
USPC ................................................. 320/166, 167
See application file for complete search history.

(56) References Cited

U.S. PATENT DOCUMENTS

| | | | | |
|---|---|---|---|---|
| 6,317,343 | B1* | 11/2001 | Okamura et al. | 363/59 |
| 6,323,623 | B1* | 11/2001 | Someya et al. | 320/166 |
| 6,441,581 | B1* | 8/2002 | King et al. | 320/101 |
| 6,650,091 | B1* | 11/2003 | Shiue et al. | 320/166 |
| 7,750,606 | B2* | 7/2010 | Rusan et al. | 320/167 |
| 7,969,121 | B2* | 6/2011 | Smith et al. | 320/167 |
| 2002/0177018 | A1 | 11/2002 | Fuglevand | |
| 2003/0214269 | A1 | 11/2003 | Shiue et al. | |
| 2009/0091302 | A1 | 4/2009 | Rusan et al. | |
| 2009/0134851 | A1 | 5/2009 | Takeda et al. | |
| 2010/0060231 | A1 | 3/2010 | Trainor et al. | |

OTHER PUBLICATIONS

European Search Report dated Oct. 27, 2011 for EP Application No. 11157409.1.

* cited by examiner

*Primary Examiner* — Edward Tso
*Assistant Examiner* — Ramy Ramadan
(74) *Attorney, Agent, or Firm* — Dorsey & Whitney LLP

(57) ABSTRACT

Electrical energy buffering system, comprising an energy source for delivering electrical energy, an energy buffer for buffering electrical energy delivered from the energy source, the energy buffer comprising a plurality of supercapacitors, and control logic for controlling the operation of the energy buffer by selectively switching the supercapacitors, wherein the plurality of supercapacitors are switchably connected in parallel to each other in a circuit comprising the energy source and an electrical power output, and the control logic comprises a buffer monitor for monitoring a parameter representing the charge or discharge state, respectively, of each of the supercapacitors and is adapted to sequentially switch single supercapacitors or groups of supercapacitors on, responsive to the detection of a first predetermined charge or discharge state, respectively, and to switch them off, responsive to the detection of a second predetermined charge or discharge state, respectively.

15 Claims, 4 Drawing Sheets

ELECTRICAL ENERGY BUFFERING SYSTEM

CROSS-REFERENCE TO RELATED APPLICATION

This application claims priority to EP Patent Application No. 11157409.1, filed Mar. 9, 2011. The entire disclosure of the prior application is considered to be part of the disclosure of the instant application and is hereby incorporated by reference herein.

TECHNICAL FIELD

Embodiments of the invention are related to electrical energy buffering, storing and management systems and are, in particular, applicable in the fields of renewable energy electric drives for vehicles, boats and submarines.

BACKGROUND OF THE INVENTION

According to the heavily growing importance of renewable energy in global energy production on the one hand and of electric and hybrid drives for cars on the other, the development of sophisticated energy buffering and storing systems has become a crucial aspect. Whereas wind farms and solar energy plants produce a rapidly increasing share of electrical energy in a couple of developed countries, the buffering of the energy produced by such power plants and the smart management of future electrical power supply systems ("smart grids") is, to a large extent, still unresolved. Likewise, the smart buffering and management of electrical energy is crucial for a significant market share and for an ecologically beneficial operation of electric cars on a broad scale. Such systems have to be tailored both to the typically discontinuous production or consumption of electrical energy and to the physico-chemical peculiarities and restraints of available battery systems.

In electronics and low-voltage systems, capacitors, and in particular electrolytic capacitors, have long been known as devices for storing energy. However, relatively low capacitances and, resulting therefrom, low energy storage capacities preclude capacitors from use in electrical energy supply systems. Recently, electrochemical double layer capacitors (EDLC), or supercapacitors, have been used in "energy smoothing" applications and momentary-load devices, and have further been used for energy-storage in vehicles and in smaller power-plant applications, like home solar energy systems.

SUMMARY

It is an object of the invention to provide a sophisticated electrical energy buffering system on the basis of supercapacitors which, more specifically, is usable for power generation control applications, as well as for power consumption control applications, on an industrial scale.

It is a further object of the invention to provide an electrical storing system, making use of supercapacitors, which allows to store electrical energy generated from renewable energy sources in an efficient manner on an industrial scale.

It is a further object of the invention to provide an electrical energy storing system, making use of supercapacitors as essential part of an improved electric or hybrid drive in vehicles etc. which are equipped with rechargeable batteries.

Still further, it is an object of the invention to provide an electrical energy management system, making use of supercapacitors, which allows for a smart management of electrical energy in electric and hybrid drives and with respect to other loads which are typically connected to up-to-date energy supply systems.

In embodiments of the invention, an electrical energy buffering system of claim 1 is provided, as well as an electrical energy storing system of claim 9, and an electrical energy management system of claim 12. Further embodiments of the invention are subject of the respective dependent claims.

According to an aspect of the invention, an energy buffer of the proposed system comprises a plurality of supercapacitors and control logic for controlling the operation of the energy buffer by selectively switching the supercapacitors according to a specific scheme. According to a further aspect of the invention, the plurality of supercapacitors are switchably connected in parallel to each other in a circuit comprising an energy source and an electrical power output. The control logic comprises a buffer monitor for monitoring a parameter representing the charge or discharge state, respectively, of each of the supercapacitors and is adapted to sequentially switch single supercapacitors or groups of supercapacitors on or off, respectively.

According to a further aspect of the invention, the switching on is responsive, at least in part, to the detection of a first predetermined charge or discharge state of the respective supercapacitor or group, and the switching off is responsive, at least in part, to the detection of a second predetermined charge or discharge state, respectively.

In at least one embodiment of the invention, the energy source may comprise a photovoltaic converter or may comprise a fuel cell. However, these examples are not exhaustive, and further useful applications related to renewable energies and beyond are possible. In other arrangements, the energy source may comprise a rechargeable battery, preferably of the Li-ion type or NiMH type or NiCd type or metal/air type.

In an embodiment of the invention, the control logic comprises a threshold discriminator provided at the respective outputs of the monitor, for providing a switch-on or switch-off signal, respectively, responsive to the detection of a parameter value above a predetermined upper threshold value or below a predetermined lower threshold value. More specifically, herein the threshold discriminator comprises programming for adjustably setting a respective threshold value.

In a further embodiment, the buffer monitor may be adapted for monitoring the output voltage of each of the supercapacitors.

In yet another embodiment, the control logic may be adapted to immediately combine a switching-off of a first supercapacitor or group of supercapacitors with a switching-on of a second supercapacitor or group of supercapacitors, essentially without delay time. Insofar, a "chain" of off-on switching operations may be implemented, ensuring an uninterrupted delivery of sufficient electrical power for buffering an electrical energy generating, storing and/or consuming process.

According to a further embodiment, the control logic may comprise a source monitor for monitoring a performance parameter of the energy source, such as an output voltage and/or output current thereof, and for providing an auxiliary control signal for influencing the switching-on of supercapacitors or groups of supercapacitors responsive to a detected value of the performance parameter.

The proposed electrical energy storing system, in principle, may comprise an energy storage device connected to the power output of the above-explained electrical energy buffering system. Herein, output side switches may be provided for each of the supercapacitor or group of supercapacitors, and the control logic may be adapted to sequentially actuate the output-side switches for connecting the supercapacitors or groups of supercapacitors to the energy storage device responsive, at least in part, to the detection of a third predetermined charge or discharge state, respectively, and for disconnecting them from the energy storage device responsive to the detection of a fourth predetermined charge or discharge state, respectively.

In some embodiments of the invention, the energy storage device may comprise a rechargeable battery, preferably of the Li-ion type or NiMH type or NiCd type or metal/air type (referenced further above as an energy source, related to the basic energy buffering system). In further embodiments, the energy storage device may comprise an electrical motor for converting electrical energy into mechanical energy and a mechanical energy storage device coupled to the motor. Flywheels are a well-known example of an energy storage device of this type.

The proposed electrical energy management system, in principle, in addition to the above-specified electrical energy buffering system, comprises a load that may consume electrical energy, and further may be connected to the power output of the buffering system. Herein, output side switches may be provided for each of the supercapacitor or group of supercapacitors, and the control logic may be adapted to sequentially actuate the output-side switches for connecting the supercapacitors or groups of supercapacitors to the load responsive to the detection of a third predetermined charge or discharge state, respectively, and for disconnecting them from the load responsive to the detection of a fourth predetermined charge or discharge state.

In an embodiment of the invention, a switchable direct connection may be provided between the energy source and the load, and the control logic may be adapted to selectively switch-on and switch-off either the direct connection between the energy source and the load or a connection via a supercapacitor or group of supercapacitors.

According to another aspect of the electrical energy management system, the load may be connected to an additional power output of the buffering system, provided in addition to its output for connecting the energy storage device. Herein, output side switches may be provided for each of the supercapacitor or group of supercapacitors, and the control logic may be adapted to sequentially actuate the output-side switches. On the one hand, this actuation may connect the supercapacitors or groups of supercapacitors to the load responsive to the detection of a third predetermined charge or discharge state, respectively, and for disconnecting them from the load responsive to the detection of a fourth predetermined charge or discharge state. Furthermore, the energy management system may comprise a switchable direct connection between the energy storage device and the load, wherein the control logic may be adapted to selectively switch on or off either the direct connection between the energy storage device and the load or the connection between the energy source and the load via a supercapacitor or a group of supercapacitors.

In one embodiment, the load may include an electric motor, such as an electric motor of a vehicle drive, boat drive or submarine drive.

The invention may provide, at least in some embodiments, a simpler and more efficient energy buffering in electrical energy supply and drive systems and, more specifically, in renewable energy applications. This may be due to the sophisticated embedding of supercapacitors by making use of their specific advantages over electrochemical cells. The insensitivity of capacitors to charging conditions and the simplicity of defining and monitoring the basic parameters for controlling such systems may provide for a simplified construction of charger and converter components and ensure a robust system operation over a broad range of environmental and operating conditions, resulting in an increased overall efficiency and utilization of the electrical energy provided by several types of energy sources.

BRIEF DESCRIPTION OF THE DRAWINGS

Further embodiments and advantages, as well as important aspects of the invention, become apparent from the following description of embodiments of the invention according to the figures.

DETAILED DESCRIPTION

Figure 1:
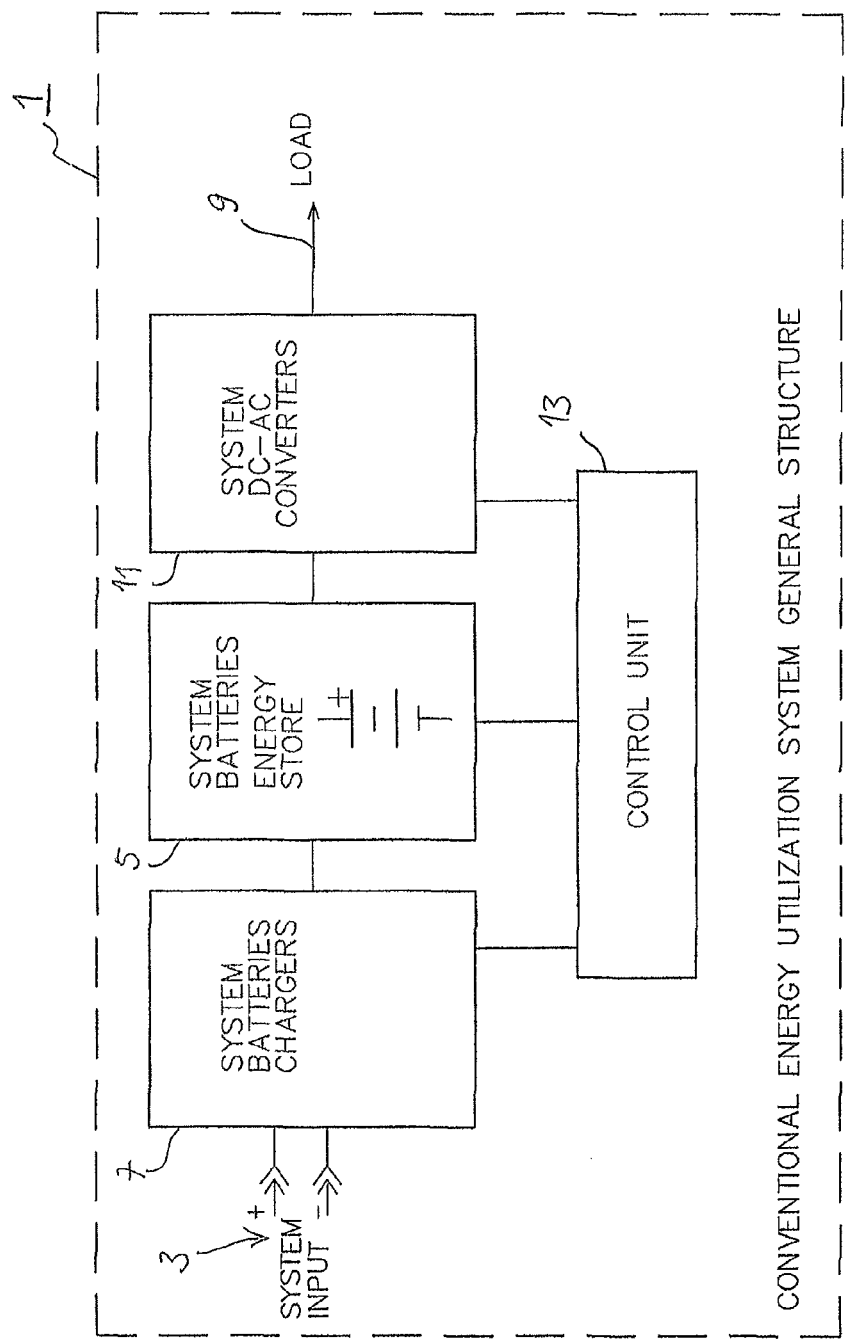
FIG. 1 shows a diagram of a prior art electrical energy management system.

FIG. 1 schematically shows the structure of a conventional electrical energy utilization or management system 1, which e.g. can be used in an electric or hybrid car or a home renewable energy system. The energy management system 1 comprises a system input (energy source input) 3, to which a system battery block (energy storage device) 5 is connected via a system battery charger block 7. A wind generator or solar panel can be connected to the system input 3 in energy supply applications, whereas a combustion engine is connected to the input in a hybrid car (and even in a conventional car). Furthermore, the system battery block 5 is connected to an output 9 via a DC-AC converter block 11, for supplying stored electrical energy to a load, which can be an electric motor or any other electrically driven equipment. For controlling the battery charging and discharging operations, as well as the DC-AC conversion and further functions of the system, a control unit 13 is provided.

Figure 2:
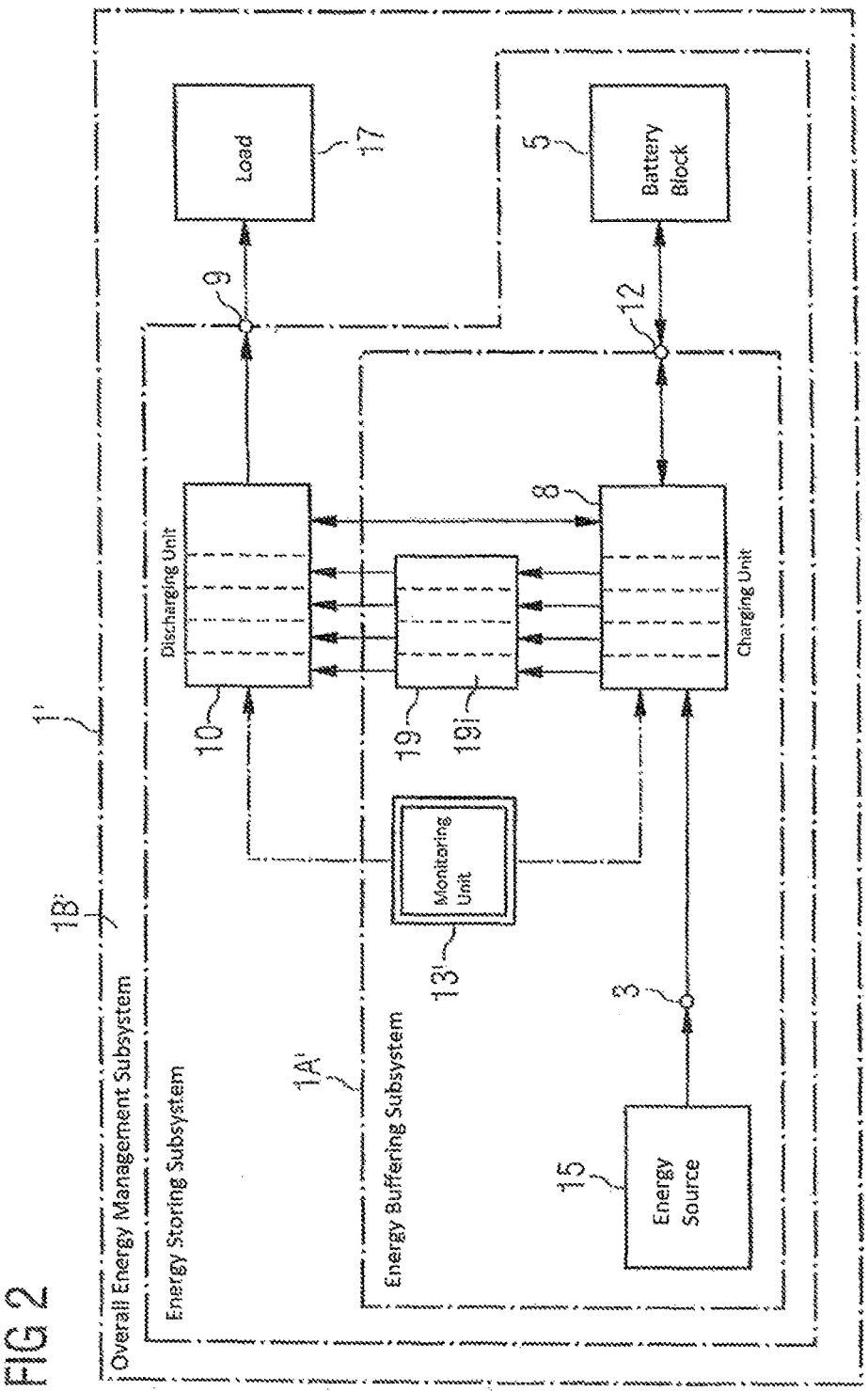
FIG. 2 shows a diagram of an electrical energy management system of the present invention.

FIG. 2 is a block diagram illustrating the general structure of an energy management system 1' according to an embodiment of the present invention. Identical or similar components to those in FIG. 1 are designated with the same or corresponding reference numerals. In FIG. 2, an energy source 15 and a load 17 are shown as components of the overall system, whereas in FIG. 1 these components have not been shown. On the other hand, in FIG. 2 any DC-DC or DC-AC converter components are omitted. Please refer to FIG. 3 and details provided further below.

In the electrical energy management system 1' of FIG. 2, a supercapacitor block 19 may comprise a number of supercapacitors 19i connected in parallel. A supercap charging unit 8 and a supercap discharging unit 10 are associated with the supercapacitor 19, and both the charging and discharging units 8, 10 may comprise a "channel" structure corresponding to the structure of block 19 and may provide individual charging and discharging operations for each of the supercapacitors 19i.

In the figure, it is shown that an output of the supercap charging unit 8 may be connected to the load 17, via the discharging unit 10 and the (first) output 9, and likewise an output of the supercap discharging unit 10 may be connected to the battery block 5 via the charging unit 8 and the (second) output 12. This second output 12 may also be connected to the supercap charging unit 8, which may have an input function, as explained below. The arrangement and mutual connections of the supercap charging unit 8, the supercap discharging unit 10, the system battery block 5 and the load 17 may be adapted to provide for multiple energy supply paths from the energy source 15 to the system battery block 5 and/or to the load 17, via the supercapacitor block 19, or from the system battery block 5 to the supercapacitor 19 and/or to the load 17, as explained further above in the general part of the description.

A modified control and monitoring unit 13' may be provided for controlling the respective energy flows and, more specifically, the consecutive charging/discharging operations of the supercapacitors 19i, to provide the outstanding system performance. The control and monitoring unit 13' may comprise an industrial standard programmable logic controller (PLC) and may be equipped with remote control, both for programming its operation and for implementing at least part of its monitoring functions. Such remote control may be implemented both as short-distance remote control, via WLAN or Bluetooth or similar standards, e.g. in home renewable energy applications, or as long-distance remote control, via mobile telecommunications networks, i.e. for implementing distributed renewable energy applications and smart grids. In FIG. 2 it is also illustrated that within the overall energy management system 1' and energy buffering system 1A'—including the energy source 15 but not including the supercap discharge unit 10, the system battery block 5 and the load 17—and an energy storing system 1B'—including all components except the load 17—may be defined as sub-systems.

Figure 3:
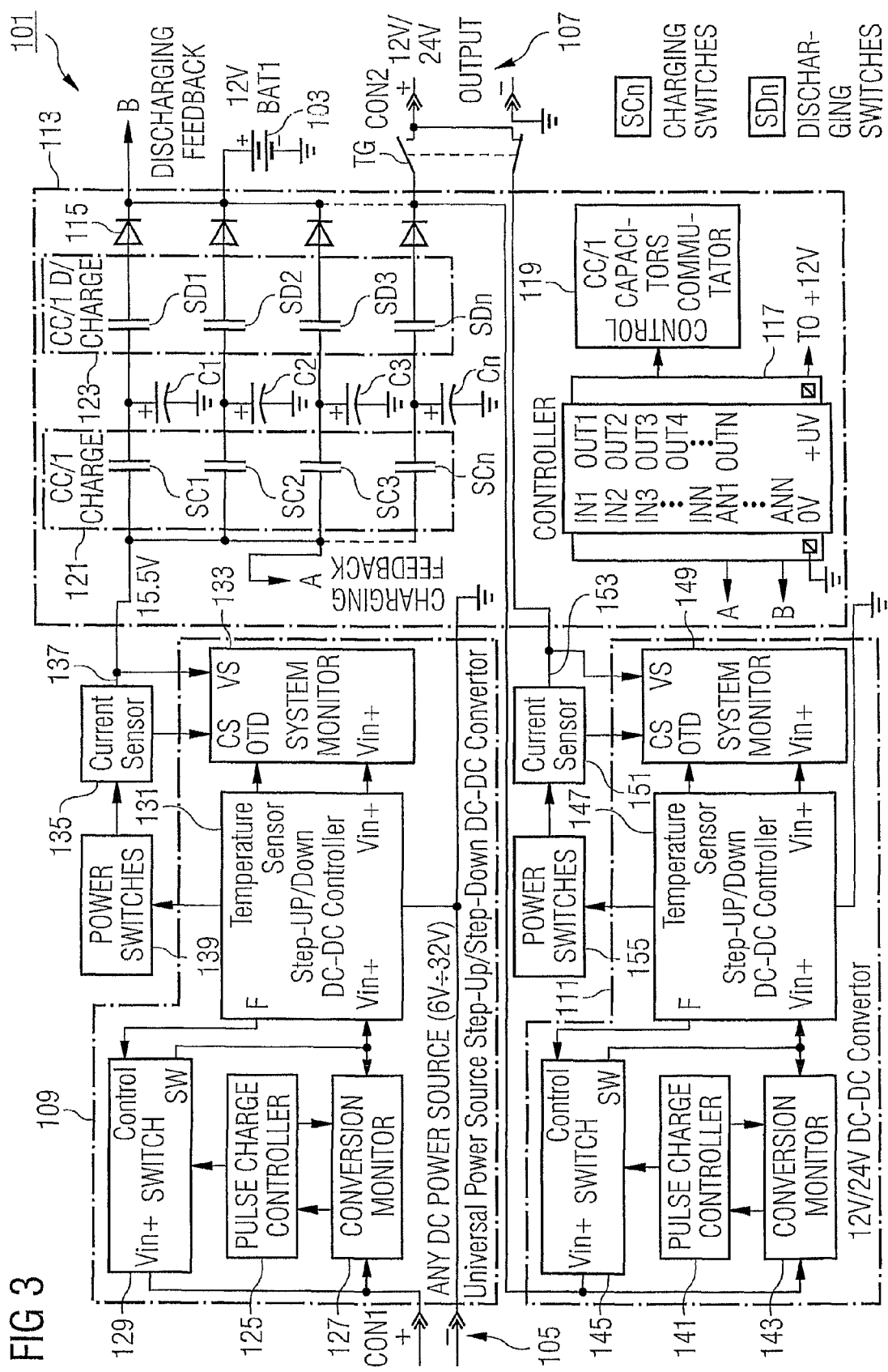
FIG. 3 shows a diagram of an electrical energy buffering circuit arrangement of an embodiment of the invention.

FIG. 3 shows an electrical energy storing system 101 that may comprise a battery 103, an energy source input 105, a load output 107, a power source step-up/step-down DC-DC converter 109, a 12V/24V DC-DC converter 111, and an energy buffering sub-system 113.

The energy buffering sub-system 113 comprises n supercapacitors C1 . . . Cn connected between the power input 105 and the load output 107 in parallel, via charging switches SC1 . . . SCn at the input side and discharging switches SD1 . . . SDn at the output side. Additionally, at the output side of each supercapacitor branch, a Schottky diode 115 may be provided, for blocking any reverse current flow. A toggle switch TG may be provided at the circuit's output, for switching the output voltage between the two predetermined levels 12V or 24V.

For controlling the operation of the energy buffering sub-system 113, a buffering controller 117 may be provided, which delivers control signals for actuating the supercapacitor charging switches SC1 to SCn and discharging switches SD1 to SDn to a capacitors commutator (switch actuator) 119. Charging feedback signals A and discharging feedback signals B may be provided to respective inputs of the buffering controller 117 from the charging switches block 121 or discharging switches block 123, respectively. Besides those feedback signals, the buffering controller 117 monitors input (power source) voltages on the one hand and output (load) voltages on the other and controls the charging or discharging switches responsive to the result of a predetermined internal processing of the signals gained through its monitoring function.

The buffering controller 117 may control the charging switches SC1 to SCn such that, upon application of a sufficient source voltage, charging of the supercapacitors C1 to CQn starts with the first supercapacitor C1, up to a predetermined upper threshold voltage. Once this upper threshold voltage is achieved, the respective charging switch SC1 may be opened, immediately followed by closing the second charging switch SC2, associated to the second supercapacitor C2, until the second supercapacitor reaches its upper threshold voltage, and so forth.

Vice versa, if a load disconnected to the output 107 and the buffering controller 117 is instructed to provide electrical energy to the load, discharging of the supercapacitors may start with actuating the discharging switch SD1 associated to the first supercapacitor C1, until a predetermined lower threshold voltage is reached. At this point of time, the first discharging switch SD1 may be opened, immediately followed by closing the second discharging switch SD2 to discharge the second supercapacitor C2 to the load, and so forth.

In an operation scheme of the energy buffering sub-system 113, assuming that an energy source and a load are connected to the second arrangement 101 at the same time, charging and discharging operations of the supercapacitors may be carried out consecutively, i.e. the discharging of one of the supercapacitors down to a predetermined output voltage is immediately followed by starting its re-charging up to a predetermined voltage, when at the same time the next one of the supercapacitors is being discharged, and so forth. This process may, assuming that no failure appears, continue until the system is powered off or a connected energy source is no longer able to provide a minimum amount of energy (input voltage). In such a situation, the buffering sub-system will be waiting until a lower input voltage level is reached, to automatically re-start its operation.

If no load is connected to the output on the circuit arrangement, a corresponding operation scheme may be applied for charging the internal battery 103. The battery under 3 may even be charged in parallel to the consecutive charging of the supercapacitors, depending on the implemented specific control scheme, and optionally on a monitor charge/discharge state of the supercapacitors. Furthermore, the buffering controller 117 can actuate the charging switches and discharging switches such that the battery 103 is discharged through the output 107, in this way serving as (secondary) energy source for supplying electrical energy to a load connected to the output 107.

The power source step-up/step-down DC-DC converter 109 provides for a broad range of usable input voltages (6V DC . . . 32V DC), in a preferred embodiment with an efficiency>92% and an output current up to 10 A. The converter 109 may comprise a pulse charge controller 25 bidirectionally connected to a conversion monitor 127, which latter is connected to the input 105, in parallel to a switch device 129. The switch device 129 provides, at an output SW thereof, a signal to the conversion monitor 127, whereas it receives, besides the voltage applied to the input 105, a control signal from a step-up/step-down DC-DC converter 131. Furthermore, the converter 109, may comprise a system monitor 133, inputs of which are connected to respective outputs of the controller 131, a current sensor 135 and the power line 137 connecting the input 105 to the supercapacitors C1 to Cn.

The converter 109 acts on power switches 139 provided in the power line 137. Given that supercapacitors are being used, the maximum voltage of which is 16.2V, the converter output voltage is set to 15.5V, so that the supercapacitors C1 to Cn will charge up to approximately 15.2V. As far as the detailed operation scheme of the converter 109 is concerned, such type of converters is, known to those of ordinary skill in the art, and additional detail may be omitted.

The configuration of the 12V/24V DC-DC converter 111 may be similar to the converter 109, i.e. it may comprise a pulse charge controller 141, a conversion monitor 143, a switch device 145, a step-up/step-down DC-DC controller 147, and a system monitor 149, and it may receive signals from a (second) current sensor 151 and (second) power line 153 and acts on power switches 155. At its input side, the converter 111 may be connected to the battery 103, instead of an external energy source, and at its output side it may be connected to the system output 107, through the toggle switch TG. In a preferred embodiment equipped with standard ICs, it can be operated with an efficiency up to 95% and an output current up to 6 A.

Figure 4:
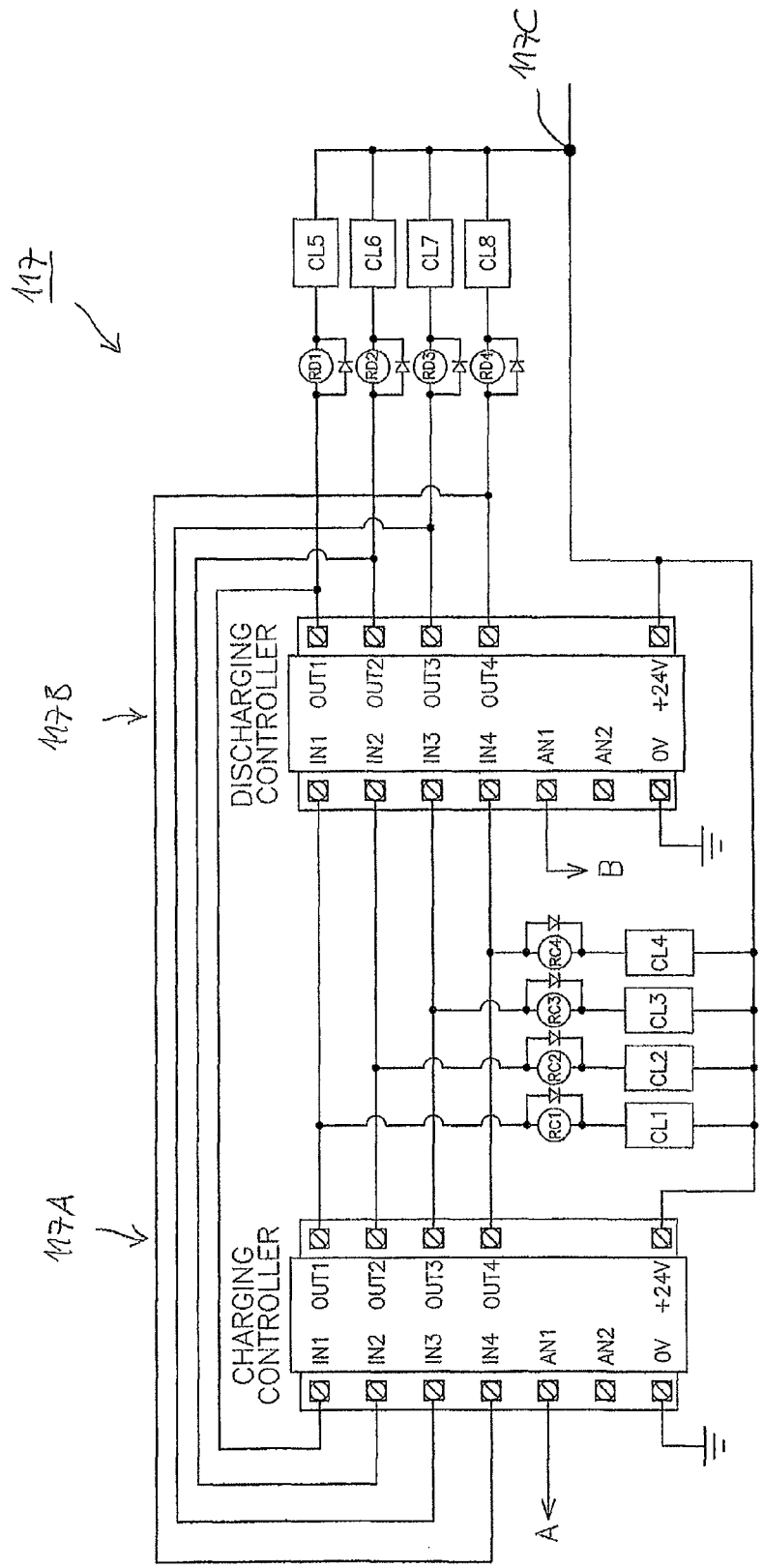
FIG. 4 shows the structure of a controller of such buffering circuit in more detail.

FIG. 4 shows a controller structure of the arrangement illustrated in FIG. 3 in more detail. The buffering controller 117 may comprise a charging controller part 117A and discharging controller part 117B, each part comprising an integrated logic as its core, the signal inputs and outputs IN1 to IN4 and OUT1 to OUT4 of both parts being connected in a feedback manner to provide for the step-up/step-down operation of the (exemplified four) supercapacitors of the system in the above-explained consecutive operating scheme. In each of the respective parallel output lines, connected to a single control signal output 117C, a charging relay RC1 to RC4 or discharging relay RD1 to RD4, each followed by a relays current limiting device CL1 to CL8, are arranged.

The embodiments and aspects of the invention explained above are not determined to limit the scope of the invention, which is exclusively to be determined by the attached claims. Many modifications of the inventive concept may be possible within the scope of the claims and, more specifically, arbitrary combinations of the several claim features are considered to be within the scope of the invention.

What is claimed is:

1. Electrical energy buffering system, comprising an energy source for delivering electrical energy, an energy buffer for buffering electrical energy delivered from the energy source, the energy buffer comprising a plurality of supercapacitors, and control logic for controlling the operation of the energy buffer by selectively switching the supercapacitors, wherein the plurality of supercapacitors are switchably connected in parallel to each other in a circuit comprising the energy source and an electrical power output, and the control logic comprises a buffer monitor for monitoring a parameter corresponding to the charge or discharge state, respectively, of each of the supercapacitors and is adapted to sequentially switch on single supercapacitors or groups of supercapacitors of the plurality of supercapacitors, responsive to the detection of a first predetermined charge or discharge state, respectively, and to switch off said single supercapacitors or groups of supercapacitors of the plurality of supercapacitors, responsive to the detection of a second predetermined charge or discharge state, respectively.

2. Electrical energy buffering system of claim 1, wherein the energy source comprises a photovoltaic converter and/or a fuel cell.

3. Electrical energy buffering system of claim 1, wherein the control logic comprises a threshold discriminator provided at the respective outputs of the buffer monitor, for providing a switch-on or switch-off signal, respectively, responsive to the detection of a parameter value above a predetermined upper threshold value or below a predetermined lower threshold value.

4. Electrical energy buffering system of claim 3, wherein the threshold discriminator comprises programming for adjustably setting a respective threshold value.

5. Electrical energy buffering system of claim 1, wherein the buffer monitor is adapted for monitoring the output voltage of each of the supercapacitors.

6. Electrical energy buffering system of claim 1, wherein the control logic is adapted to immediately combine a switching-off of a first supercapacitor or group of supercapacitors with a switching-on of a second supercapacitor or group of supercapacitors, essentially without delay time.

7. Electrical energy buffering system of claim 1, wherein the control logic comprises a source monitor for monitoring a performance parameter of the energy source, preferably an output voltage and/or output current thereof, and for providing an auxiliary control signal for influencing the switching-on of supercapacitors or groups of supercapacitors responsive to a detected value of the performance parameter.

8. Electrical energy buffering system of claim 1, wherein the energy source comprises a rechargeable battery, preferably of the Li-ion type or NiMH type or NiCd type or metal/air type.

9. Electrical energy storing system, comprising an electrical energy buffering system of claim 1 and an energy storage device connected to the power output of the electrical energy buffering system wherein output side switches are provided for each of the supercapacitor or group of supercapacitors, and control logic is adapted to sequentially actuate the output-side switches for connecting the supercapacitors or groups of supercapacitors to the energy storage device responsive to the detection of a third predetermined charge or discharge state, respectively, and for disconnecting them from the energy storage device responsive to the detection of a fourth predetermined charge or discharge state, respectively.

10. Electrical energy storing system of claim 9, wherein the energy storage device comprises a rechargeable battery, preferably of the Li-ion type or NiMH type or NiCd type or metal/air type.

11. Electrical energy storing system of claim 9, wherein the energy storage device comprises an electrical motor for converting electrical energy into mechanical energy and a mechanical energy storage device coupled to the motor.

12. Electrical energy management system, comprising an electrical energy storing system of claim 9 and a load for consuming electrical energy, connected to an additional power output of the electrical energy buffering system wherein output side switches are provided for each of the supercapacitor or group of supercapacitors, and the control logic is adapted to sequentially actuate the output-side switches for connecting the supercapacitors or groups of supercapacitors to the load responsive to the detection of a third predetermined charge or discharge state, respectively, and for disconnecting them from the load responsive to the detection of a fourth predetermined charge or discharge state, and comprising a switchable direct connection between the energy storage device and the load, wherein the control logic is adapted to selectively switch on or off either the direct connection between the energy storage device and the load or the connection between the energy source and the load via a supercapacitor or a group of supercapacitors.

13. Electrical energy management system, comprising an electrical energy buffering system of claim 1 and a load for consuming electrical energy, connected to the power output of the electrical energy buffering system, wherein output side switches are provided for each of the supercapacitor or group of supercapacitors, and the control logic is adapted to sequentially actuate the output-side switches for connecting the supercapacitors or groups of supercapacitors to the load responsive to the detection of a third predetermined charge or discharge state, respectively, and for disconnecting them from the load responsive to the detection of a fourth predetermined charge or discharge state.

14. Electrical energy management system of claim 12, wherein a switchable direct connection is provided between the energy source and the load, and the control logic is adapted to selectively switch-on and switch-off either the direct connection between the energy source and the load or a connection via a supercapacitor or group of supercapacitors.

15. Electrical energy management system of claim 12, wherein the load comprises an electrical motor, preferably of a vehicle drive, boat drive or submarine drive.

* * * * *